United States Patent [19]

Lauenstein et al.

[11] Patent Number: 4,932,423
[45] Date of Patent: Jun. 12, 1990

[54] TOBACCO FEEDING APPARATUS

[75] Inventors: Michael Lauenstein, Cormondréche; Bernard Tallier, Gorgier, both of Switzerland

[73] Assignee: Fabriques de Tabac Reunies, S.A., Neuchatel, Switzerland

[21] Appl. No.: 268,989

[22] Filed: Nov. 9, 1988

[30] Foreign Application Priority Data

Nov. 16, 1987 [CH] Switzerland .................. 4450/87

[51] Int. Cl.$^5$ .............................................. A24C 5/39
[52] U.S. Cl. ................................... 131/110; 131/108; 131/109.1; 131/109.2; 131/84.3
[58] Field of Search ................... 131/110, 108, 109.1, 131/109.2, 84.1, 84.3

[56] References Cited

U.S. PATENT DOCUMENTS 3,544,167 12/1970 Fuchu et al. ..................... 131/110
3,580,644 5/1971 Ballard ............................ 131/110
4,832,058 5/1989 Labbe ............................ 131/110

FOREIGN PATENT DOCUMENTS 2139870 11/1984 United Kingdom .

Primary Examiner—V. Millin
Assistant Examiner—Jennifer L. Doyle
Attorney, Agent, or Firm—Jeffrey H. Ingerman

[57] ABSTRACT

In apparatus for feeding tobacco to cigarette-making machines, the tobacco (9) is conveyed by suction from a feed receptacle (1). One end (14) of a duct (3) facing the receptacle above the level (19) of the tobacco is provided with a device (16) for regulating the rate of tobacco delivery in order to allow continuous feeding of the cigarette-making machine. The regulating device comprises a movable sleeve (17) slidable on the end portion (14) of the duct so that the bottom rim (18) of the sleeve is always at a required distance H from the level of the tobacco, this distance being continuously detected by a sensor (25), and the quantity of tobacco drawn into the duct to be adapted to the rate of production being a function of H. The other end (15) of the duct opens out into a tangential separator (12). The regulating device combined with the tangential separator makes it possible to reduce damage to the particles of tobacco.

8 Claims, 3 Drawing Sheets

FIG. 2
FIG. 2A
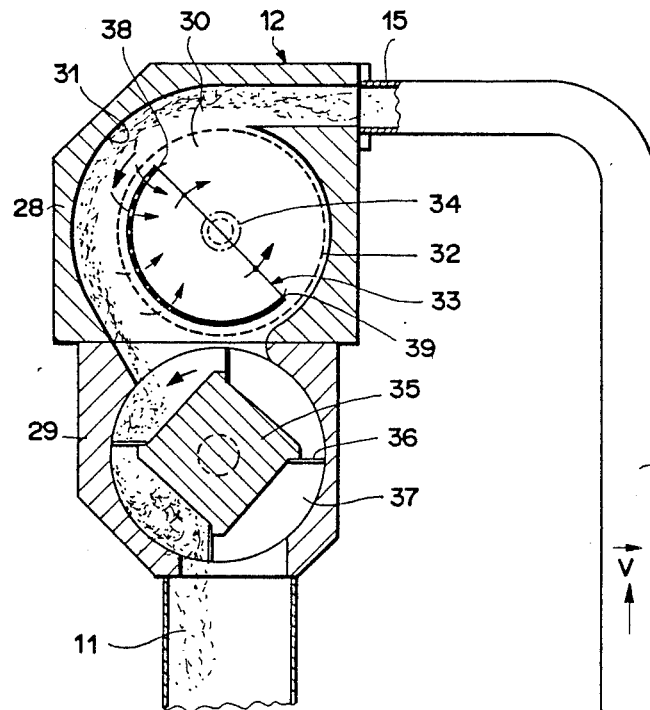
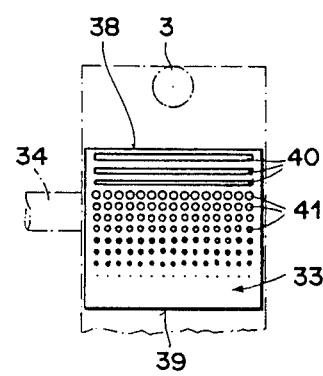
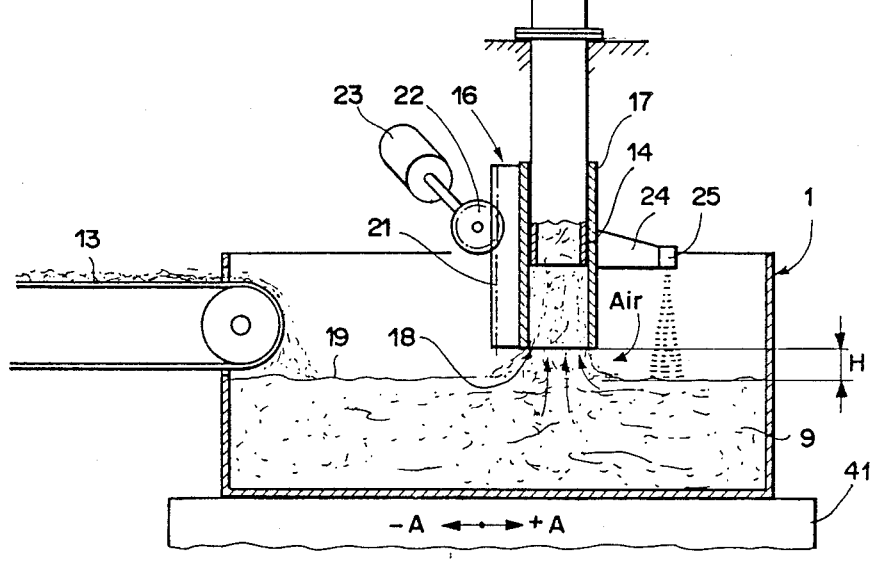

TOBACCO FEEDING APPARATUS

This invention relates to an installation for feeding tobacco to one or more manufacturing machines, particularly for manufacturing cigarettes, of the type having on one side a feed receptacle containing tobacco not free of residual dust, on the other side a sluice or lock performing the separation of the dust and the tobacco and discharging the latter into the respective machine for manufacturing cigarettes, as well as a connection duct by means of which the tobacco and the dust mixed with it are transported by suction from the receptacle toward the sluice or lock.

Prior art apparatus used for feeding tobacco to cigarette-making machines generally operates in consecutive cycles. A basic diagram of such apparatus is shown in FIGS. 1A and 1B of the accompanying drawings. It comprises a feed receptacle 1 and a separator 2 connected by a duct 3. The separator is further connected by a duct 5 to a turbine (not shown) producing the suction, regulated by a flap valve 6. The apparatus is also provided with a trap 8.

The operating cycle is as follows: in a first phase, the separator being empty, flap 6 open, and trap 8 closed, the suction produced by the turbine draws the tobacco and the residual dust mixed with it through duct 3 and into separator 2 at a speed of about 22 m/sec. The tobacco remains stuck against a grating or screen 7, while the air and the extracted dust pass through the screen and are exhausted through duct 5. In a second phase, there being a certain quantity of tobacco in the separator, suction is cut off by closing flap valve 6. Simultaneously, trap 8 is opened so that the tobacco drops as a block into a bin 20 of the cigarette-making machine 4. The level of tobacco in bin 20 drops gradually according to the production rate of machine 4 until it reaches a minimum level. At that moment, a call for tobacco is set off, and the suction cycle of a new quantity Q recommences.

The essential problem with the prior art apparatus is the loss and damage of a significant amount of tobacco—about 3%—during its travel from the feed source to the bin of the machine. The mode of operation is actually too rough for expanded particles of tobacco, which are fragile: for one thing, during the suction cycle, the particles of tobacco are subjected in the separator to suction forces which flatten them against one another, causing breakage; for another thing, when valve 6 is closed and during any interruption of the suction, tobacco 10 (FIG. 1A) remains in duct 3. When the cycle starts up again with the opening of the valve, these particles are subjected to very brusque acceleration, their velocity going from 0 to 22 m/sec. virtually instantaneously. Conversely, when the cycle stops, all the particles in the duct are abruptly braked, their speed then dropping from 22 m/sec. down to zero. The particles of expanded tobacco are subjected to substantial turbulence and friction which likewise bring about breakage of a large number of particles and the formation of tobacco "dust" which is then exhausted with the air.

One prior art device, shown in FIG. 4 of U.K. published patent application No. 2,139,870, does not present any solution to this problem. As a matter of fact, it will be noted that the feed operation remains cyclical and that the matter of stress on the particles of tobacco resulting from abrupt acceleration and deceleration at the beginning and end of each suction cycle is not resolved.

It is an object of this invention to provide improved feed apparatus which operates continuously rather than cyclically, thus minimizing damage to the tobacco particles during their travel and eliminating the formation of dust and consequent losses.

To this end, in the installation according to the present invention, of the type initially mentioned, the end portion of the duct cooperating with the feed receptacle, and through which the tobacco is drawn into the duct, is provided with a device for regulating the rate of delivery of the tobacco, which device permits the installation to operate continuously, while the quantity of tobacco drawn in is adapted to the rate of production of the respective cigarette-manufacturing machine being used.

In a preferred embodiment of the invention, the sluice or lock into which the other end portion of the duct opens out is a tangential sluice or lock which, contrary to the usual separator utilizing a flap valve, allows separation between the tobacco and the air without abrupt braking.

Other objects and advantages of the invention will become apparent from the following detailed description of this preferred embodiment thereof, taken in conjunction with the accompanying drawings, in which:

FIG. 2 is an operating diagram of the invention feed apparatus,

FIG. 2A is a developed view from the left of the diaphragm of the tangential separator.

Figure 1A:
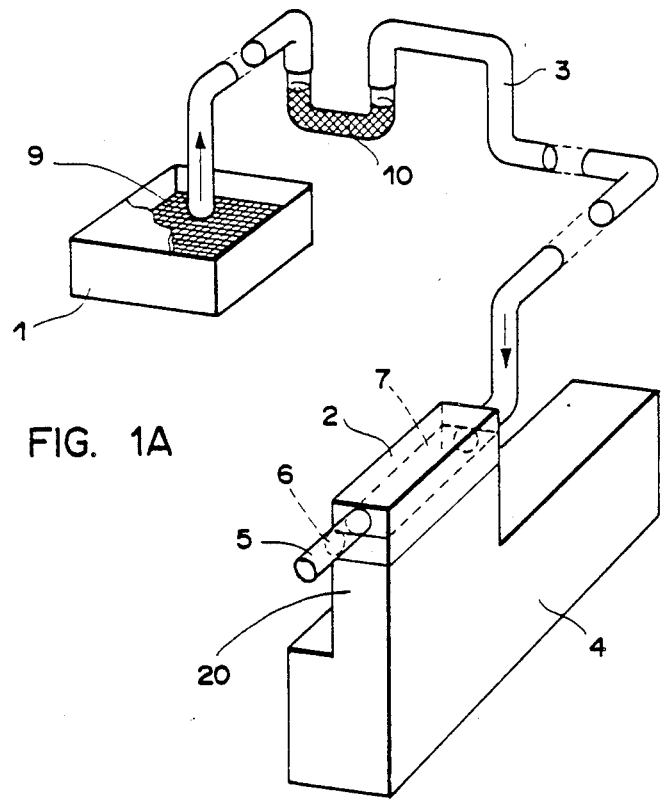
FIG. 1A shows a basic overall diagram of the system of the invention.
Figure 1B:
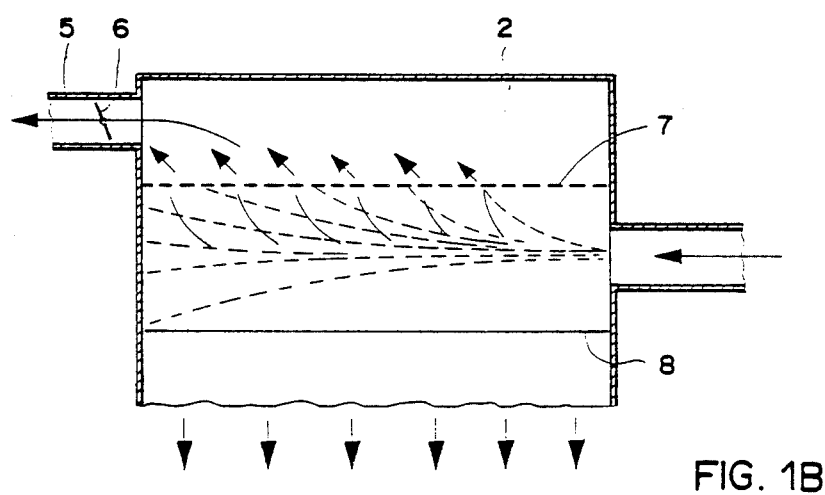
FIG. 1B shows the separator of the invention.

In FIG. 2, the means and elements corresponding to those already encountered in FIGS. 1A and 1B bear the same reference numerals, viz., feed receptacle 1 containing tobacco 9 still mixed with residual dust, fixed duct 3, and, in place of the flap-valve separator, a tangential separator 12.

A device 16 for regulating the throughput or rate of delivery of the tobacco is disposed on the end portion 14 of duct 3, the axis of which is preferably perpendicular to the plane formed by the level 19 of the tobacco 9. It comprises a movable sleeve 17 which can slide along end portion 14 so that the bottom rim 18 of sleeve 17 is situated at a variable height H from level 19. The means (not shown) for sliding and guidance of sleeve 17 on end portion 14 are known per se and need not be described in detail.

The tobacco 9 is dumped into feed receptacle 1, e.g., by means of a conveyor belt 13 or a hopper. Level 19 always remains substantially horizontal, receptacle 1 being integral with a vibrator 41 imparting to the receptacle a horizontal reciprocating movement of short amplitude −A, +A. This vibration device is likewise conventional and is shown only diagrammatically in FIG. 2.

Sleeve 17 is itself equipped with a rack 21 engaging a pinion 22 actuated by a motor 23. Screwed or welded opposite actuating device 21, 22, 23 is an arm 24, at the end of which there is fixed a detector 25, e.g., an ultrasonic or optical (particularly infrared) sensor. Sleeve 17 may, of course, be actuated by any other suitable means; thus, provision may be made for a device made up of pneumatic or hydraulic elements.

Figure 4:
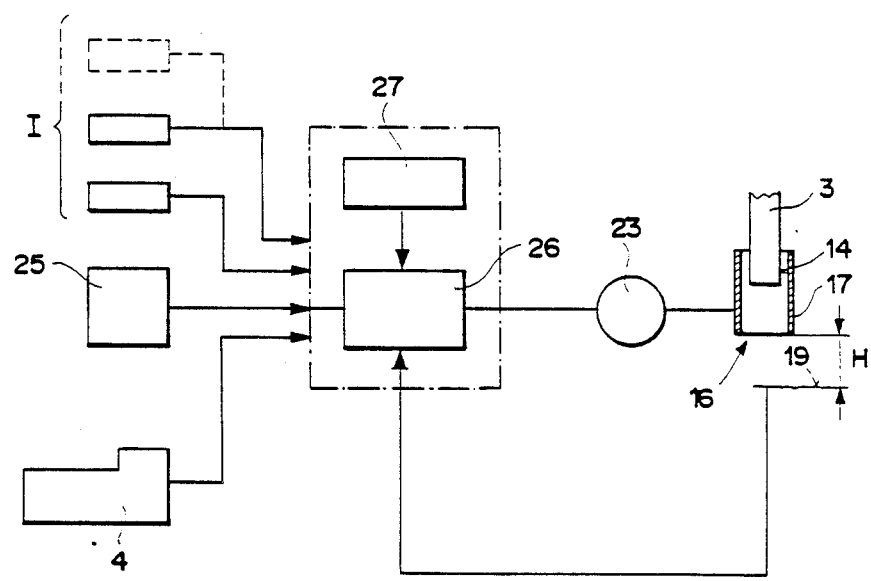
FIG. 4 is a block diagram of the control for regulating the quantity of tobacco.

As may be seen from FIG. 4, sensor 25 is preferably connected to a control unit 26, which is in turn connected to a scheduler 27. Unit 26 controls motor 23 so that regulating device 16 is actuated in order to position sleeve 17 at the required value H. The control is carried out according to a program which takes into account input data 1: besides the data supplied by the sensor, particularly the data relating to the rate of production of the machine to which tobacco is to be fed, the qualitative nature of the particles and the quantity thereof contained in receptacle 1, the position of a regulating valve at the outlet of separator 12, the suction velocity of the air, etc.

Figure 3:
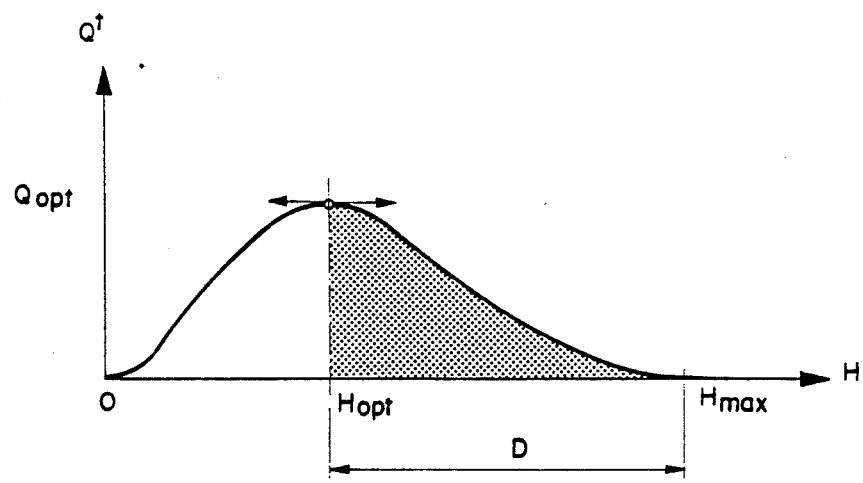
FIG. 3 is a graph showing the curve of the quantity of tobacco drawn in as a function of the height H.

The mode of operation is easy to understand: when the suction is turned on, the air carries along the particles of tobacco 9 which are transported with it into duct 3. The tobacco 11 freed of residual dust is dumped into the bin of the machine according to a process to be explained below. Device 16 makes it possible to adapt the quantity of tobacco 11 very exactly to what is actually required, taking into account the production rate and shutdowns of the cigarette-making machine. The quantity of tobacco drawn up will, in fact, be a function of the height H, i.e., of the subsidence created. A graph of this function is shown in FIG. 3. It will be seen that the "Quantity=f (H)" has the shape of a slightly deformed Gauss curve. For a theoretical value of H=0, the quantity of tobacco drawn up will be zero. As the value of H increases, the quantity of tobacco drawn up will also increase until it reaches a maximum corresponding to an optimum value of H; these values are symbolized in FIG. 3 by $Q_{opt}$ and $H_{opt}$, respectively. If the value of H is further increased while sleeve 17 is slid upward, the quantity of tobacco drawn up will decrease, the subsidence at level 19 diminishing. The quantity of tobacco will gradually approach 0 as a value of H symbolized in FIG. 3 by $H_{max}$ is approached. All the time, control unit 26, 27 is registering the various quantitative and qualitative data I mentioned above (air velocity, moistness of the tobacco, its specific gravity, etc.) and will derive from these parameters, on the basis of a programmed algorithm, the ideal value of H for drawing up just the amount necessary. The means for operating sleeve 17 will thus be actuated by the control unit as soon as it proves necessary to correct the current value of H. As the operational range D of device 16, it is preferable to select the interval between $H_{opt}$ and $H_{max}$.

In order that the advantages provided by the regulating device 16 described may be fully utilized, another characteristic of the invention consists in achieving a new combination by providing at the other end portion 15 of duct 3 a tangential separator 12 shown only in cross-section in FIG. 2. Contrary to the separator 2 comprising a trap 8, a tangential-type separator makes it possible for the operation of tobacco-air separation to be carried out without abrupt braking, the tobacco losing its initial velocity only gradually.

Separator 12 is composed of an upper element 28 and a lower element 29. Element 28 comprises a duct 30 having a circular part and an outer wall 31 (which is extremely smooth so that the particles of tobacco "glide" along this duct and are not damaged by roughness), a cylindrical rotary grating or screen 32, and a fixed diaphragm 33 for regulating the subsidence. Element 28 further comprises a duct 34 for exhausting the air axially (corresponding to duct 5 in FIG. 1B) and a flap-valve (not shown, corresponding to valve 6 in FIG. 1B) by means of which the quantity and velocity of the suction air may be optimized.

FIG. 2A is a developed left-hand view of diaphragm 33 of FIG. 2. Made of sheet metal, it takes the form in a preferred embodiment of a semi-cylindrical drum having base edges 38, 39, the axis of which is superimposed on that of screen 32. Diaphragm 33, pivoted about this axis, is fixed in a certain position which is, as will be seen below, a function of various parameters, particularly the suction velocity V and hence the suction force, as well as the specific gravity and degree of moisture of the tobacco. In FIG. 2, the position of diaphragm 33 is such that the prolongation of its base 38, 39 forms an angle of about 45° with the axis of the entry of duct 3. The cylindrical portion of diaphragm 33 is provided with several rows of apertures 40, 41 through which the air and dust drawn out through duct 34 circulate. As may be seen in FIG. 2A, apertures 40 are rectangular slots, whereas apertures 41 are circular holes. It will be noted that the opening areas of the apertures decrease from top edge 38 to bottom edge 39. Thus, in the example being described, the opening area of the first row 40, i.e., the first rectangular slot, is about 80 sq.cm., whereas the total area of the circular holes in the last row 41 is about 10 sq.cm.

Lower element 29 comprises a casing having a cylindrical interior and a rotary shaft 35 of square cross-section provided with vanes 36 which, in the present embodiment, form four compartments 37. Assembly 35, 36 is rotatingly driven counterclockwise (as viewed in FIG. 2) in the cylindrical interior of element 29 by means of a reducing motor (not shown). The same motor likewise rotates cylindrical screen 32 via a transmission mechanism (also not shown). Shaft 38 can rotate at the same speed of rotation as screen 32 or at a different, preferably lower, speed.

When the feed apparatus is in operation, the tobacco enters separator 12 at the operating velocity $\vec{V}$. In order to avoid breaks in the particles of tobacco, it is then imperative that they not be subjected to any violent stress but rather slip along wall 31 with virtually no friction. This requirement explains the positioning of diaphragm 33 and the conformation of its apertures 40, 41:

To begin with, the initial inertia of the particles of tobacco, and correlatively, the centrifugal force, which additionally includes a component created by the rotation of screen 32, is relatively great; this centrifugal force tends to press the particles against wall 31. This inertia then rapidly decreases, and along with it, the centrifugal force. The abating centrifugal force is offset by a corresponding centripetal force owing to the particularities of diaphragm 33 already described. The effect of this equilibrium is a gradual slowing down of the particles. Hence the separation of the particles of tobacco from the air and dust is optimally ensured.

Lower element 29 acts thereafter as an atmospheric separator; for owing to compartments 37, the dust-free tobacco 11 is emptied continuously into the bin of the cigarette-making machine, and any turbulence which might be caused by atmospheric pressure is eliminated.

Thus, the apparatus of the present invention superlatively accomplishes the proposed objectives. The cigarette-making machine is continuously fed with particles of tobacco according to its rate of production. Moreover, owing to the described device 16 for regulating the quantity of tobacco, expulsion takes place automatically, which constitutes an effect of the greatest importance: if control unit 26 receives data indicating that there is too much tobacco, e.g., because the machine has stopped, sleeve 17 is raised so as to reach the level $H_{max}$. The suction of fresh tobacco from feed receptacle 1 is halted, and the tobacco in duct 3 continues to travel inasmuch as the regulating flap-valve (bearing reference numeral 6 in FIG. 1B) remains open for a few more seconds. The valve is then closed once expulsion has taken place. During this operation, the particles of tobacco are not subjected to any shock resulting from brusque deceleration or acceleration. Finally, the continuous operation makes it possible to transport the particles of tobacco at a speed on the order of from 1 to 15 m/sec., hence at a much lower speed than that required in prior art apparatus.

Whereas damage in conventional apparatus amounts to about 3%, it is reduced to less than 1% in the apparatus described above, which represents a considerable saving taking into account the cost of the raw material, i.e., the particles of processed tobacco, and the quantity thereof.

The regulating device, concentrated in a simple, compact unit, presents a particularly sophisticated and ingenious solution based upon the idea, for regulating the quantity of tobacco, of introducing the variation of a parameter (H) at the source, rather than downstream. Furthermore, the device presents the advantage that the variations in absolute height of the tobacco in the feed receptacle have no effect upon the proper continuity of the apparatus.

The initial speed of the tobacco decreases gradually. Friction and flattening of the particles of tobacco are avoided, which, together with the device for regulating the rate of delivery of the tobacco, contributes toward reducing still further the damaging of the tobacco and toward improving the output and the quality of the finished product.

What is claimed is:

1. Apparatus for feeding tobacco to one or more manufacturing machines, particularly for manufacturing cigarettes, of the type having a feed receptacle for holding tobacco not free or residual dust, separator means for separating dust from the tobacco and for discharging the tobacco into said one or more machines, and a duct disposed between the receptacle and the separator means for conveying the tobacco and the dust by suction from the receptacle to the separator means, wherein the improvement comprises:

regulating means disposed at the end of said duct nearest said receptacle for continually delivering tobacco at a feed rate that varies continuously between zero and a maximum feed rate as a function of the rate of production of said one or more machines.

2. The apparatus of claim 1, wherein said regulating means comprises a sleeve mounted on an end portion of said duct, sleeve-actuating means for sliding said sleeve reciprocatingly on said end portion for keeping the rim of said sleeve nearest said receptacle at a variable distance H from the level of tobacco in said receptacle, and detector means for continuously supplying a value corresponding to said distance H.

3. The apparatus of claim 2, wherein said sleeve-actuating means comprise a motor, a rack, and a pinion engaging said rack and driven by said motor.

4. The apparatus of claim 2, wherein said sleeve-actuating means comprise pneumatic elements.

5. The apparatus of claim 2, further comprising programmable control means for controlling said sleeve-actuating means.

6. The apparatus of claim 2, wherein said detector means is an ultrasonic sensor.

7. The apparatus of claim 2, wherein said detector means is an optical sensor.

8. The apparatus of claim 1, wherein said separator means is a tangential separator.

* * * * *

UNITED STATES PATENT AND TRADEMARK OFFICE
CERTIFICATE OF CORRECTION

PATENT NO. : 4,932,423

DATED : June 12, 1990

INVENTOR(S) : Michael Lauenstein et al.

It is certified that error appears in the above-identified patent and that said Letters Patent is hereby corrected as shown below:

Column 2, lines 29-31 should be deleted in their entirety.

Column 4, line 13, "V" should be -- $\vec{V}$ --.

Signed and Sealed this

Twenty-eighth Day of July, 1992

*Attest:*

DOUGLAS B. COMER

*Attesting Officer*  *Acting Commissioner of Patents and Trademarks*